Patented May 25, 1943

2,319,826

UNITED STATES PATENT OFFICE 2,319,826

ADHESIVE COMPOSITION

Fred G. Pellett, Alplaus, N. Y., assignor to General Electric Company, a corporation of New York No Drawing. Application October 10, 1941, Serial No. 414,499

14 Claims. (Cl. 260—42)

This invention relates to adhesive coating and laminating compositions characterized by hardness, good strength, and adhesive power. It is particularly concerned with compositions of the above class containing as the principal ingredients thereof certain alkyd resins combined with polyvinyl esters.

This application is a continuation-in-part of my copending application Serial No. 391,546, filed May 2, 1941, and assigned to the same assignee as the present invention. In that application, I have disclosed and claimed bonded mica products containing resinous compositions adapted for use as binders for the mica particles and comprising blended or heat-reacted mixtures of a polyvinyl ester resin and various alkyd resins including maleic anhydride-pentaerythritol resins and resins obtained by reacting glycerine with 3,6-endomethylene-Δ-4-tetrahydrophthalic anhydride in the presence of air. The latter alkyd resin is more fully described and claimed in my copending application Serial No. 391,547, filed May 2, 1941, and assigned to the same assignee as the present invention.

The present application relates to my discovery that valuable, heat-hardenable, adhesive and coating compositions may be made by combining, in certain proportions, an alkyd resin comprising the polyhydric alcohol reaction products of 3,6-endomethylene-Δ-4-tetrahydrophthalic anhydride and the polyhydric alcohol reaction products of maleic acid or its anhydride with a polyvinyl ester.

These resinous materials have been found to be compatible over a wide range of proportions to produce thermosetting adhesive compositions ideally suited for a wide field of applications. For example, the compositions may be used for bonding steel laminations, as in the production of laminated cores for transformers or other electrical apparatus wherein good adhesion is obtained even after prolonged ageing of the bonded laminations at elevated temperatures. The compositions are thermosetting to such an extent that there is no detrimental plastic flow of the heat-hardened binder at the elevated temperatures encountered during operation of electrical apparatus. On the other hand, the heat-hardened products are sufficiently flexible to expand or contract with the steel during any non-uniform changes in temperature of the device thus preventing delamination of the bonded structures. Other properties of the compositions of importance in this application are their toughness and water-resistance.

Likewise, my compositions may be used for bonding the individual turns of electric coils and the like into solid, water-proof and heat-resistant, unitary structures.

My adhesive compositions are also particularly useful in the manufacture of laminated glass fiber and asbestos articles. The important properties imparted to such laminated articles are increased strength, arc resistance, resistance to decomposition, i. e., little tendency towards embrittlement under the effects of heat, and resistance to plastic flow at elevated temperatures. The compositions may also be used as a mica sticker or binder. For example, they may be used for bonding mica to a backing of glass fiber cloth or the like.

The alkyd resin component, which contains the polyhydric alcohol reaction product of 3,6-endomethylene-Δ-4-tetrahydrophthalic anhydride, commercially known as "Carbic anhydride" and obtained by reacting cyclopentadiene with maleic anhydride, may be the air-blown product described in my copending application Serial No. 391,547 referred to hereinbefore or may be one obtained by reacting the polybasic acid or anhydride with a polyhydric alcohol in the absence of air or in the presence of an inert atmosphere such as nitrogen. Preferably, the alcoholic component of this resin should comprise a major portion of glycerine. Ethylene glycol or mixtures of ethylene glycol and pentaerythritol may be substituted for all or part of the glycerine but for maximum mechanical strength and water resistance, the mixtures of reactive polyhydric alcohols should average more than two but not more than three hydroxyl groups per molecule. Preferably the "Carbic anhydride" and polyhydric alcohol are reacted in equivalent or substantially equivalent proportions.

In the prepartion of the second alkyd resin component of my adhesive compositions, the tetrahydric alcohol, pentaerythritol, is the preferred alcohol reacted with maleic acid or anhydride to obtain in the final product the maximum heat-curability and resistance to plastic flow at elevated temperatures. However, glycerine can be used in place of the pentaerythritol with some loss of the thermosetting properties of the composition. Minor amounts of the pentaerythritol may also be replaced by dihydric alcohols such as ethylene glycol provided the resultant polyhydric alcohol component averages three or more hydroxyl groups per molecule.

Both of the above alkyd resins prepared separately or together are compatible with the polyvinyl acetate component. The preferred polyvinyl acetate is one which has been polymerized to such an extent that a 30 per cent solution thereof in acetone has a viscosity of at least one poise at 20° C. Equivalent polyvinyl esters may be substituted for the polyvinyl acetate and if desired partially hydrolyzed polyvinyl esters such as a partially hydrolyzed polyvinyl acetate may also be used. Similarly, a partially hydrolyzed polyvinyl ester that has been reacted with an aldehyde to form the corresponding acetal may be substituted for all or part of the polyvinyl ester component and it is to be understood that the terms "a polyvinyl ester" or "a polyvinyl acetate" as used in the appended claims are intended to cover not only the original polymer, but also the partially hydrolyzed polymer, as well as the aldehyde-reacted partially-hydrolyzed derivative.

I have found that these three resinous materials are compatible over a wide range of proportions to produce my novel adhesive compositions. The resinous component of such compositions should ordinarily contain from 10 to 50 per cent by weight of a polyvinyl ester and from 50 to 90 per cent by weight of the combined "Carbic anhydride"-polyhydric alcohol and maleic anhydride-polyhydric alcohol resinous reaction products in which combination the "Carbic anhydride" product is present in a major amount. Preferably, the compositions contain from 30 to 80 parts by weight of the "Carbic anhydride" resin and from 5 to 30 parts of the maleic anhydride resin. A particularly useful composition contains 20 parts polyvinyl acetate, 60 parts "Carbic anhydride" resin, and 20 parts maleic anhydride resin blended or heat-reacted with or without the application of heat. The resultant compositions are soluble in denatured alcohol if the solutions have a concentration of 35 per cent solids or more, or in a mixture of alcohol and toluene if the solutions are less concentrated. Alternatively, any two of the resinous materials may be blended or heat-reacted and then combined in solution with the third component.

In order that those skilled in the art may better understand how my invention may be carried into effect the following examples are given illustrating the preparation of my compositions:

*Example I*

*Carbic anhydride resin.*—A mixture of 73 parts 3,6-endomethylene-$\Delta$-4-tetrahydrophthalic anhydride and 27 parts glycerine are placed in an aluminum or glass container provided with a stirring arrangement, a reflux, and means such as a glass tube for introducing air into the reaction mixture. The ingredients are heated to about 170° C. to 180° C. and air is continuously bubbled therethrough during the cooking period. The cook is continued for about 3½ to 5 hours, i. e., until the cure is about 20 seconds on a 200° C. hot plate, after which the liquid resin is removed from the container and cooled as rapidly as possible.

*Maleic anhydride resin.*—A resin is made by cooking two mols of maleic anhydride with one mol pentaerythritol at a temperature of 120° C. to 130° C. for about three hours or until the cure of a fairly thick film takes about fifteen seconds on a 200° C. hot plate.

*Polyvinyl acetate resin.*—Preferably the polyvinyl acetate resin is one polymerized to such an extent that a 30 per cent acetone solution thereof has a viscosity of approximately 1 poise at 20° C.

Sixty parts by weight of the "Carbic anhydride" resin, 20 parts of the maleic anhydride resin and 20 parts of the polyvinyl acetate are dissolved in 200 parts by weight of a mixed solvent consisting of ethyl alcohol and about 10 per cent toluol to form the desired coating or laminating composition. More rapid solution of the resins may be obtained by heating the composition to a moderately elevated temperature for a short time.

It is within the scope of my invention to prepare the maleic anhydride resin in the presence of the previously reacted, or partially reacted, "Carbic anhydride" resin. For example, I may proceed as in the following example:

*Example II*

492 parts of "Carbic anhydride" and 184 parts of glycerine are heated in a glass reaction vessel with reflux for about 1 hour at 170–180° C. while blowing a continuous stream of air through the batch. 150 parts of maleic anhydride and 100 parts pentaerythritol are added and the cook continued for an additional hour at about 150–160° C. to a cure point of about 40 seconds for a thick film on a 200° C. hot plate. The resin is then cooled and dissolved in denatured alcohol. This solution is blended cold with a solution of polyvinyl acetate so that the resin proportions are 60 parts of the above-described resin to 40 parts of polyvinyl acetate. The product is quite similar to that obtained in Example I.

As was previously indicated, the "Carbic anhydride" resin component which is believed to lend adhesiveness, hardness, and water resistance to the composition, may be that obtained by reacting "Carbic anhydride" with the designated alcohol, generally in equimolecular proportions, in the absence of air or in the presence of an inert atmosphere such as a nitrogen atmosphere. The use of the air-blown product results in a composition possessing greater water-resistance, strength, and toughness, although the nitrogen-cooked resin is compatible with the polyvinyl acetate over a wider range of proportions.

An increase in the amount of maleic anhydride resin in the composition imparts increased adhesiveness thereto, particularly when the composition is used to bond steel laminations or other non-porous sheet materials. The use of larger proportions of the maleic anhydride resin also produces compositions capable of being more readily cured to an infusible state under the influence of heat with a corresponding decrease in the amount of plastic flow of the heat-cured products at elevated temperatures. This is particularly true when the alcoholic component of the resin consists of pentaerythritol. However, if the maleic anhydride resin is used in amounts substantially exceeding 30 per cent by weight of the resin mixture, the heat-cured product may exhibit poorer water-resistance unless it is very thoroughly cured.

The polyvinyl ester component is believed to furnish toughness and strength to the heat-cured products and, as has been indicated, the proportion thereof may be varied over a comparatively wide range. If desired, this resin, or a portion thereof, may be reacted into the maleic anhydride resin during the preparation of that alkyd resin.

Alternatively, when the total alcoholic content of the two alkyd resins averages about three hydroxyl groups per molecule, the "Carbic anhydride," the maleic anhydride, and the polyhydric alcohol may be reacted together to the desired end point as is shown in the following example:

Example III 800 parts "Carbic anhydride," 200 parts maleic anhydride, and 424 parts glycerine are heated in apparatus such as that described in Example II for about 2 hours at 180° C. An alcohol solution of this resin is blended with a solution of polyvinyl acetate so that the proportions are 80 parts of the above resin to 20 parts polyvinyl acetate. This product cures less rapidly than those of Examples I and II.

Laminated articles comprising sheets of glass fiber, asbestos, steel, or the like, bonded by means of my improved bonding material are preferably made by coating or impregnating the individual sheets with a suitable solution of the bonding material, evaporating or partially evaporating the solvent, and then assembling the treated sheets and subjecting the assembly to combined heat and pressure for a sufficient time to obtain a unitary structure bonded by the heat-hardened resinous material. Temperatures of about 125–200° C. and pressures of from 50 to 1200 pounds per square inch, depending upon the nature of the sheet material, are usually sufficient. If desired, the assembly may be given an after-bake to further strengthen the bond.

It is to be understood that the corresponding acids may be used in place of either the 3,6-endomethylene - Δ - 4 - tetrahydrophthalic anhydride or the maleic anhydride in the preparation of my adhesive compositions and in the appended claims the term "anhydride" is intended to cover the corresponding acid.

What I claim as new and desire to secure by Letters Patent of the United States is:

1. A heat-hardenable adhesive composition, the resinous component thereof consisting, by weight, of from 10 to 50 per cent of a polyvinyl acetate and from 50 to 90 per cent of a resinous material consisting of the reaction product of 3,6-endomethylene-Δ-4-tetrahydrophthalic anhydride and polyhydric alcohol averaging from 2 to 3 hydroxyl groups per molecule and the reaction product of maleic anhydride and polyhydric alcohol averaging from 3 to 4 hydroxyl groups per molecule, the endomethylene tetrahydrophthalic anhydride reaction product being present in a major amount.

2. A heat-hardenable adhesive composition, the resinous component thereof consisting, by weight, of from 10 to 50 per cent polyvinyl acetate and from 50 to 90 per cent of a resinous reaction product of glycerine and a mixture of a major proportion of 3,6-endomethylene-Δ-4-tetrahydrophthalic anhydride and a minor proportion of maleic anhydride.

3. An adhesive composition, the resinous component of which consists of from 30 to 80 parts by weight of the resinous reaction product of 3,6 - endomethylene - Δ - 4 - tetrahydrophthalic anhydride and polyhydric alcohol averaging 2 to 3 hydroxyl groups per molecule, from 5 to 30 parts by weight of the resinous reaction product of maleic anhydride and polyhydric alcohol averaging at least 3 hydroxyl groups per molecule and from 10 to 50 parts by weight of a polyvinyl acetate.

4. An adhesive composition, the resinous component of which consists of from 30 to 80 parts by weight of the resinous reaction product of 3,6 - endomethylene - Δ - 4 - tetrahydrophthalic anhydride and glycerine, from 5 to 30 parts by weight of the resinous reaction product of maleic anhydride and pentaerythritol, and from 10 to 50 parts by weight of polyvinyl acetate.

5. An adhesive composition consisting of a solvent, from 30 to 80 parts by weight of the air-blown resinous reaction product of 3,6-endomethylene-Δ-4-tetrahydrophthalic anhydride and glycerine, from 5 to 30 parts by weight of the resinous reaction product of maleic anhydride and petaerythritol, and from 10 to 50 parts by weight of polyvinyl acetate.

6. A heat-hardenable adhesive composition comprising about 60 parts by weight of an 3,6-endomethylene - Δ - 4 - tetrahydrophthalic anhydride-glycerine resin, about 20 parts by weight of a maleic anhydride-pentaerythritol resin, and about 20 parts by weight of polyvinyl acetate.

7. A laminated article, the individual laminations of which are bonded together by the heat-hardened composition of claim 1.

8. A laminated article comprising a plurality of individual laminations bonded into an integral structure by the heat-hardened composition of claim 2.

9. A laminated article comprising a plurality of individual laminations bonded together by the heat-hardened composition of claim 3.

10. An adhesive composition containing from 10 to 50 per cent by weight of a polyvinyl acetate, from 5 to 30 parts by weight of the resinous reaction product of maleic anhydride and pentaerythritol and from 30 to 80 parts by weight of the resinous reaction product of 3,6-endomethylene-Δ-4-tetrahydrophthalic anhydride and polyhydric alcohol averaging from 2 to 3 hydroxyl groups per molecule.

11. A laminated article comprising a plurality of steel laminations bonded together by the heat-hardened composition of claim 10.

12. A laminated article comprising a plurality of glass fiber sheets bonded together by the heat-hardened composition of claim 3.

13. A laminated article comprising mica flakes bonded together by the heat-hardened composition of claim 1.

14. A laminated article comprising mica flakes bonded together by the heat-hardened composition of claim 6.

FRED G. PELLETT.